July 23, 1957  E. A. WAHL  2,800,252
POWDER-FEEDING APPARATUS
Filed March 17, 1954  7 Sheets—Sheet 1

Inventor:
Eugene A. Wahl
By Gaylor, Cifelli & Jurick
Attorneys

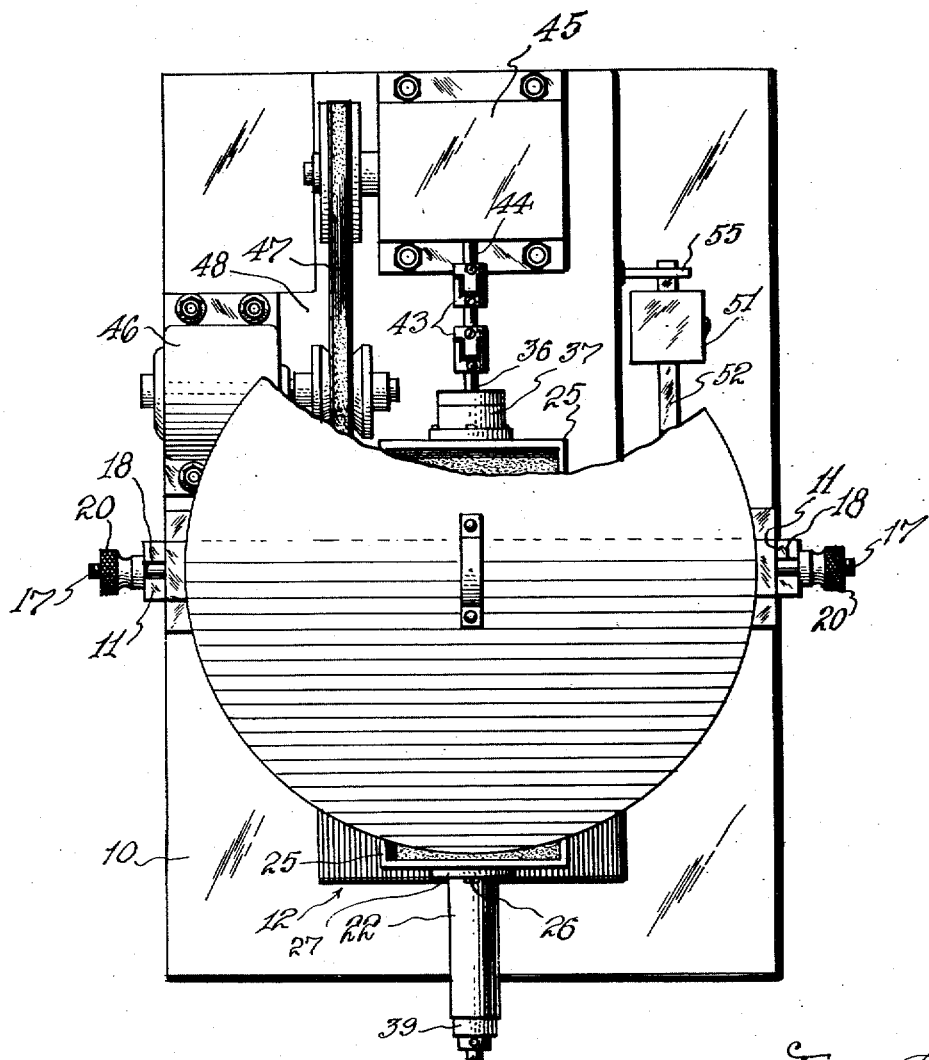

July 23, 1957 E. A. WAHL 2,800,252
POWDER-FEEDING APPARATUS
Filed March 17, 1954 7 Sheets-Sheet 3
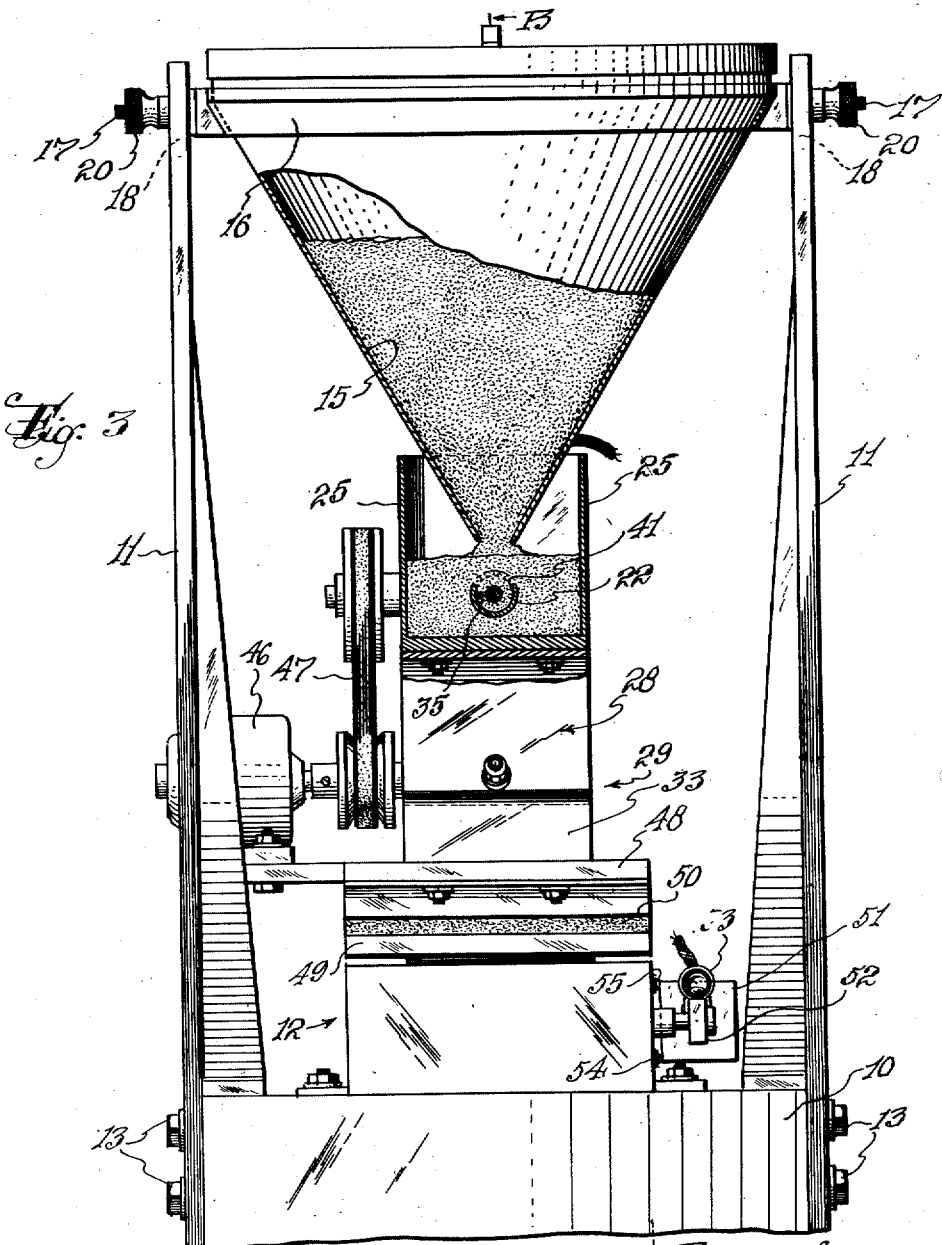
Inventor:
Eugene A. Wahl
By Gaylor, Cifelli & Jurick
Attorneys.

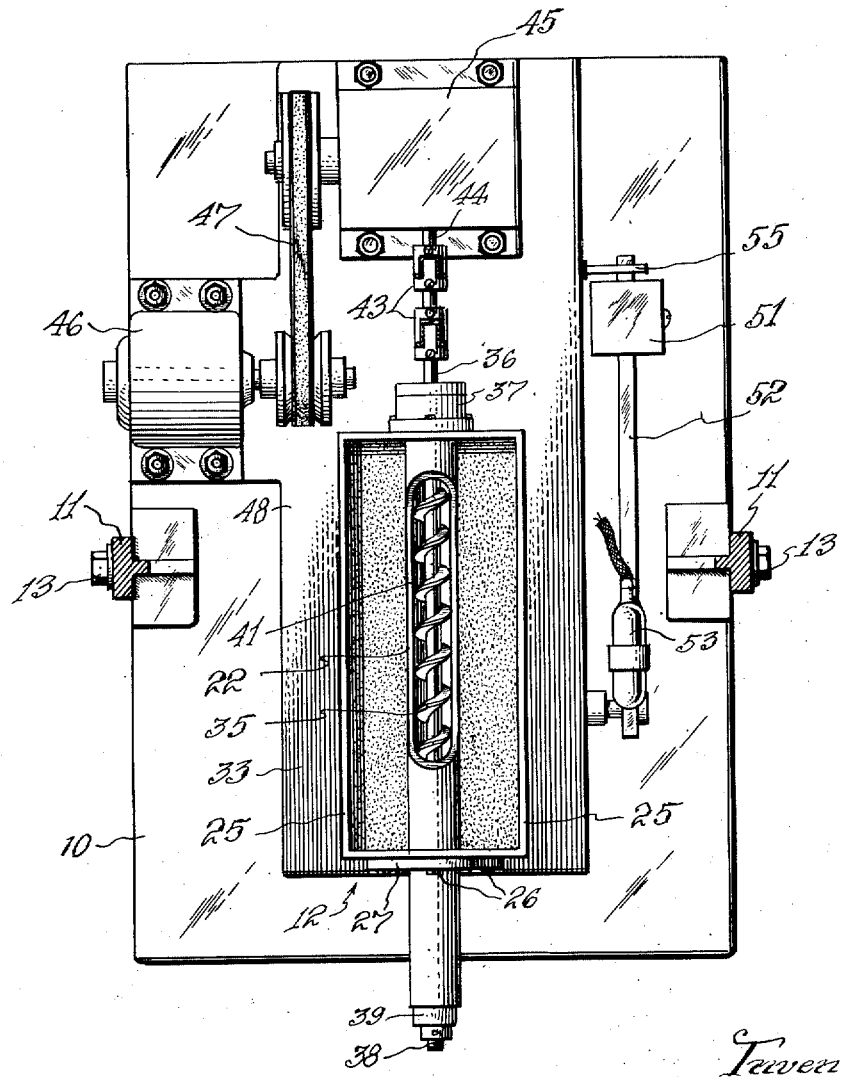

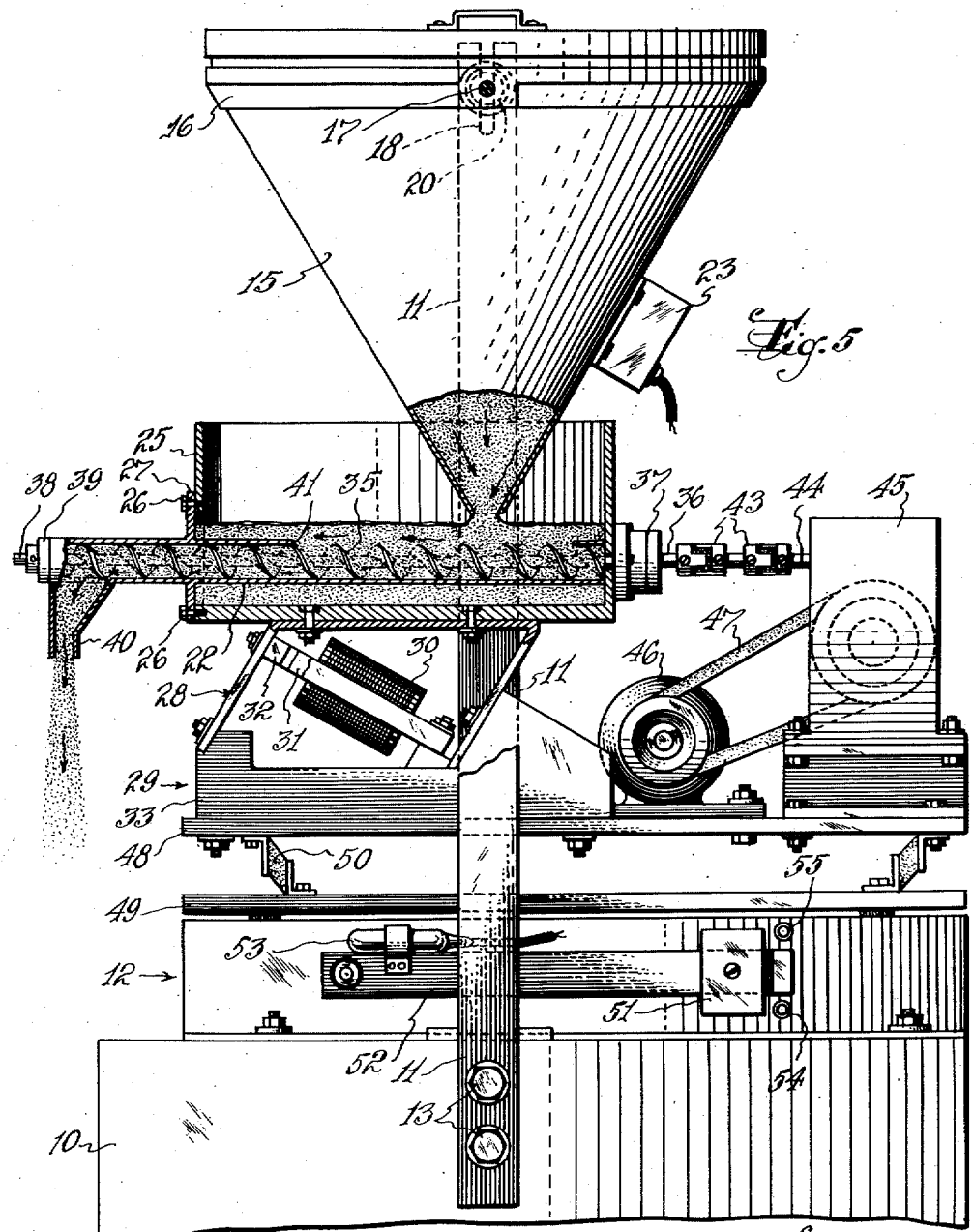

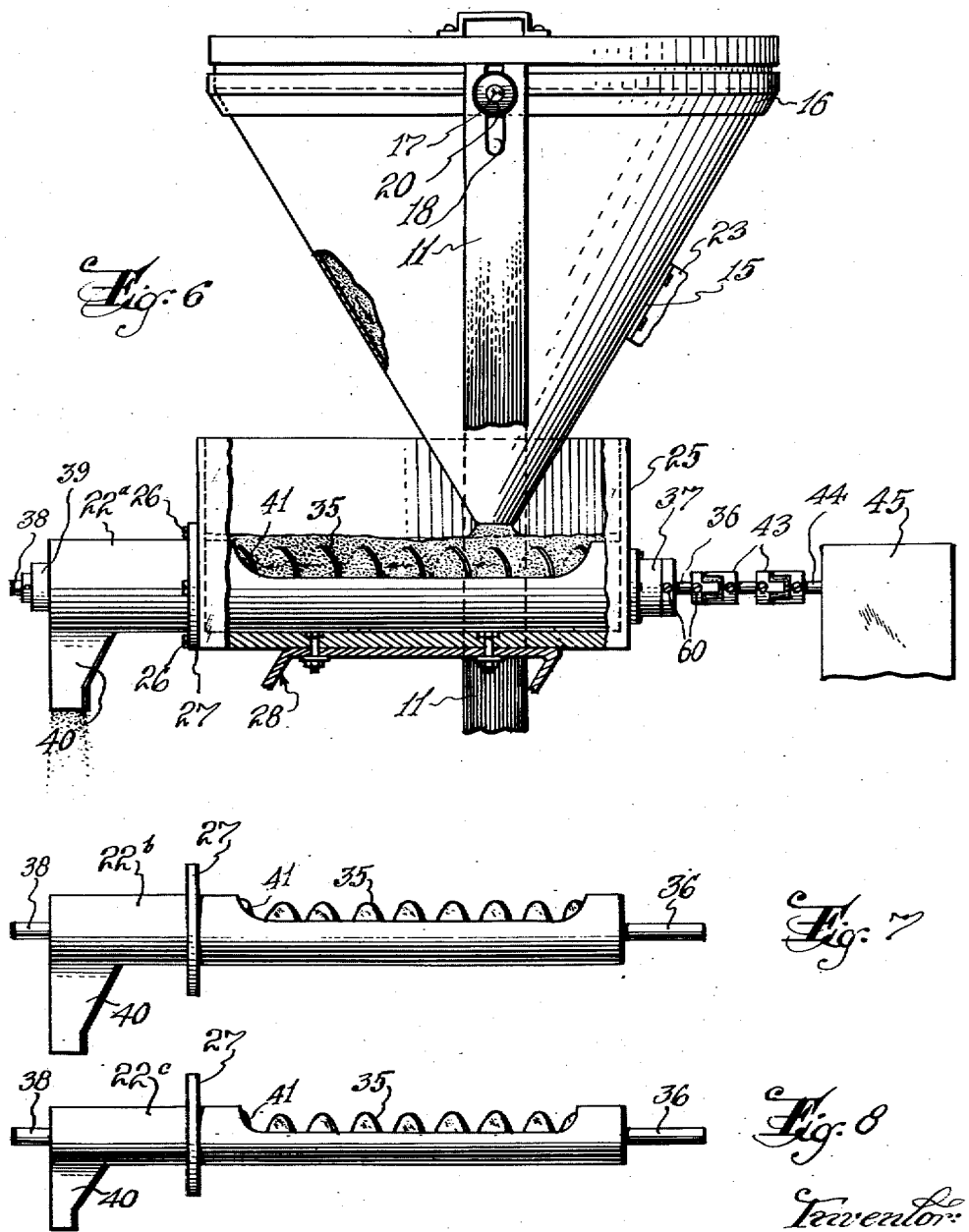

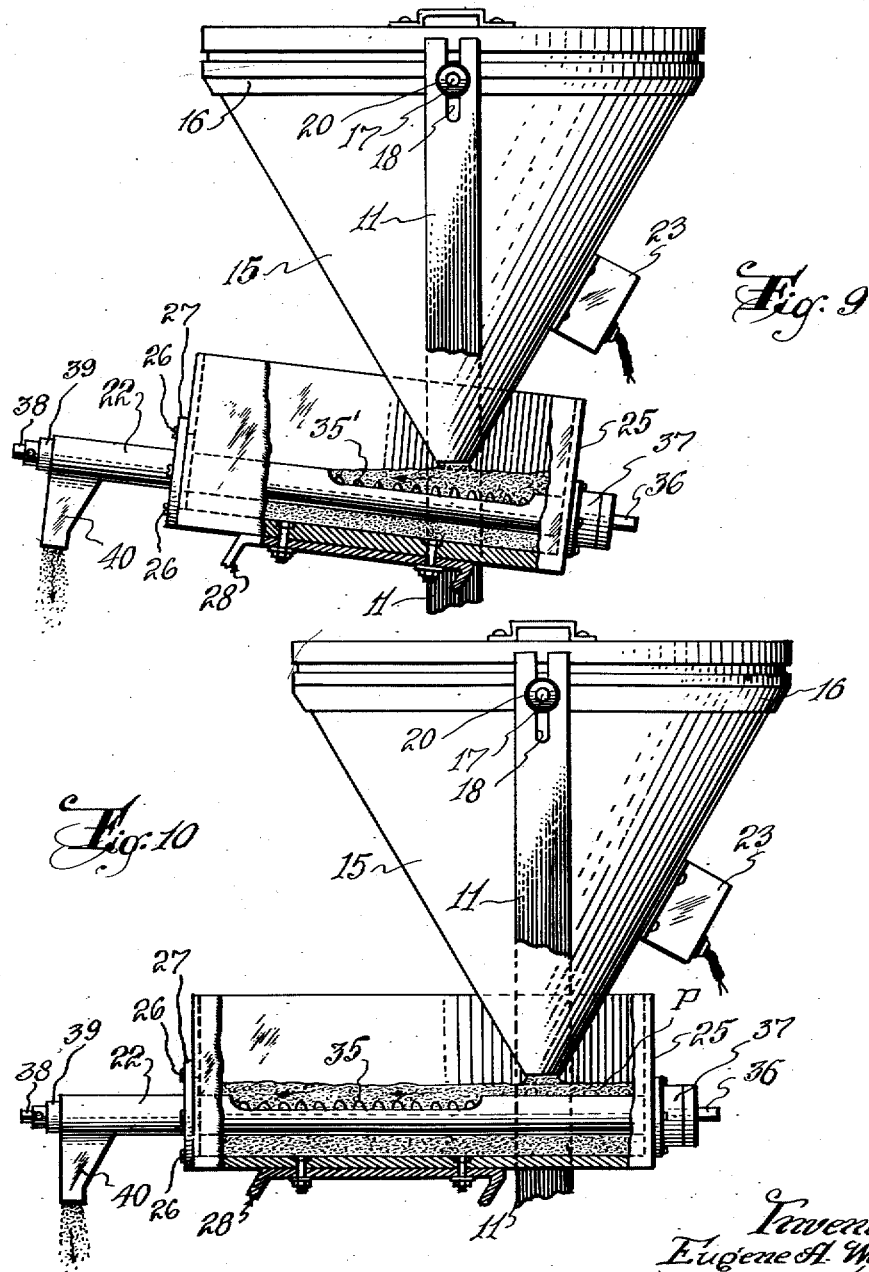

United States Patent Office 2,800,252
Patented July 23, 1957

2,800,252

POWDER-FEEDING APPARATUS

Eugene A. Wahl, Glen Ridge, N. J.

Application March 17, 1954, Serial No. 416,794

21 Claims. (Cl. 222—55)

This invention relates to automatic powder-feeding apparatus and more particularly to apparatus for continuously feeding powdered and granular materials into a medium or container at a predetermined volumetric rate.

Powder-feeding apparatus is employed to discharge measured amounts of powder into a medium as, for example, chemicals into a stream of water for purification and treatment. Various volumetric powder-feeding arrangements have been proposed heretofore. Such prior apparatus and machines, however, are not capable of uniform operation with powdered materials of widely-different flow characteristics such as, for example, free-flowing granular dry powders and sticky amorphous powders. Nor are the prior devices readily adjustable to compensate for the widely varying densities found, under practical conditions, in powders of the same composition. These mentioned, variable factors affect the operating accuracy of the device so that the best accuracy to be expected, under optimum conditions is 5 percent while actually the inaccuracies may reach 15 percent under actual conditions commonly encountered in practice. Still further, and importantly, some materials naturally resist gravitational flow under most all conditions of use other than those subject to elaborate moisture control. Consequently, such materials cannot be handled by present volumetric feeders.

An essential feature of my invention resides in a novel arrangement wherein powder from a storage hopper is fed to a dispensing tube housing an auger rotating at a predetermined, constant speed and having a selected axial disposition relative to vertical. The tube and auger are simultaneously vibrated by suitable means. Under the simultaneous action of auger rotation and vibration powder is discharged from an open end of the tube at a predetermined volumetric rate at an operating accuracy and reliability factor far exceeding that possible with existing apparatus.

An object of this invention is the provision of powder-feeding apparatus of simple, straight-forward design, rugged construction and of positive and highly accurate operation.

An object of this invention is the provision of a powder-feeder combining the action of mechanical vibration and a rotating auger to dispense powdered materials at a predetermined volumetric rate.

An object of this invention is the provision of apparatus for dispensing powder at a predetermined, constant volumetric rate and comprising a storage hopper for the powder, a vibratory tube receiving powder dispensed from the hopper, a rotatable auger axially disposed within the tube, and means for simultaneously vibrating the tube and auger, the arrangement being such that the powder is discharged from an open end of the tube upon rotation and vibration of the auger and tube.

An object of this invention is the provision of apparatus for dispensing powder at a predetermined volumetric rate comprising a vibratory tube adapted to receive powder from a storage hopper, a rotatable auger axially disposed within said tube said auger having its axis inclined upwardly relative to horizontal, means rotating the auger at a predetermined speed, means imparting mechanical vibrations of predetermined characteristics to the tube and auger, and means regulating the flow of the powder from the hopper to the tube in accordance with the rate of discharge of the powder from the tube.

These and other objects and advantages will become apparent from the following description when taken with the accompanying drawings illustrating apparatus made in accordance with this invention. It is to be understood that the drawings are for purposes of illustration and are not to be construed as defining the scope or limits of the invention, reference being had for the latter purpose to the appended claims.

In the drawings wherein like reference characters denote like parts in the several views:

Figure 2 is a plan view of such apparatus;

Figure 3 is an end elevation, with parts in section;

Figure 4 is a horizontal section taken along the line A—A of Figure 1;

Figure 5 is a vertical section taken along the line B—B of Figure 3;

Figure 6 is a fragmentary side view, with parts in section, showing a relatively large diameter auger in operative position relative to the storage hopper;

Figures 7 and 8 are side views showing augers of different diameters disposed within associated tubes and adapted for ready substitution for the similar assembly shown in Figure 6;

Figure 9 is a fragmentary view, with parts in cross section, of another embodiment of my invention and wherein the axis of the auger is inclined upwardly; and Figure 10 is a view similar to Figure 9 and showing an arrangement wherein the intake opening to the auger is offset relative to the discharge opening of the hopper.

Figure 1:
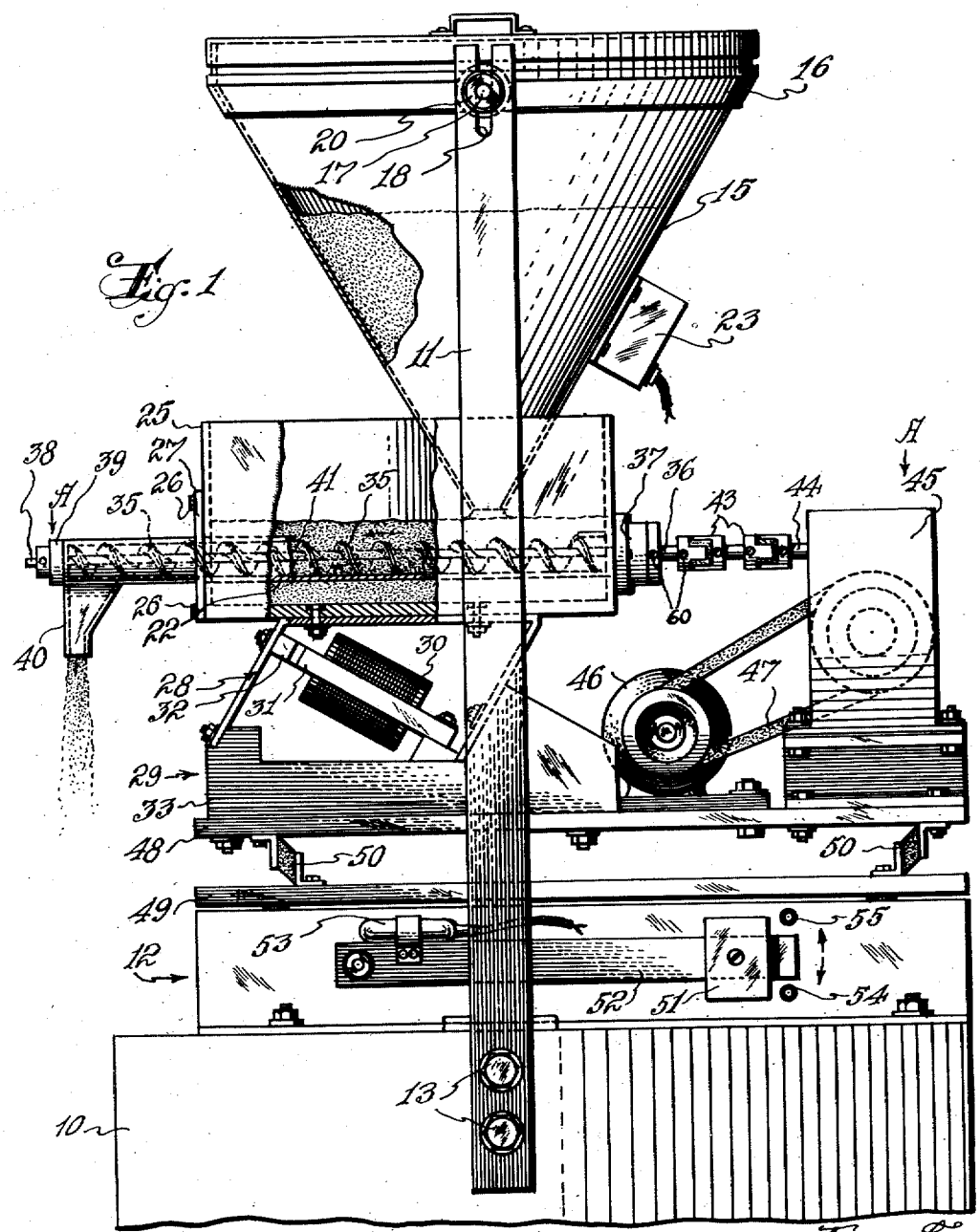
Figure 1 is a side elevation, with parts in section, of a powder-feeder made in accordance with one embodiment of this invention.

Reference is now made to Figures 1–5. The apparatus is supported on a rigid base 10 to which are secured a pair of upwardly-extending brackets 11 as by the bolts 13. These brackets straddle a platform-type weighing scale 12 that rests upon the base 10. As best shown in Figures 1 and 3, a cone-shaped hopper 15 is removably carried by the vertical brackets as by means of the metal band 16 (encircling the hopper) and the diametrically-opposed screws 17 which are secured to the band and extend through the slots 18 provided in the free ends of the brackets. It will be apparent that the hopper is readily secured to and removed from the brackets by tightening or loosening the knurled thumb nuts 20. The lower end of the hopper constitutes a discharge opening through which powder from the hopper is fed into a tube 22 upon vibration of the hopper by the electro-magnetic vibrator 23, the latter being attached to the hopper wall by any suitable means.

The tube 22 is secured in fixed position within a generally rectangular housing, or trough, 25 as by the screws 26 passing through the flange 27 and into threaded holes provided in the front wall of the housing, said flange being rigidly secured to the tube as by welding. It is here pointed out that the housing 25 is secured to and supported solely by the yoke, or frame, 28 of an electro-magnetic vibrator 29, such vibrator being of conventional construction and including a solenoid 30 carried by a soft-iron core 31 which is alined with and normally spaced from a soft-iron plug 32 secured to the frame. The solenoid and frame are secured to a relatively heavy base 33 whereupon energization of the solenoid by a pulsating electrical current results in a mechanical vibration of the housing 25, substantially angular to its major axis.

An auger 35 extends through the tube 22, said auger being provided with an end shaft 36 that extends through a bearing 37 that is rigidly secured to the rear wall of the housing 25. An alined shaft 38 is similarly journaled for rotation in the bearing 39, the latter, however, being rigidly secured to the tube 22. A powder-discharge nozzle 40 is secured to the front end of the tube 22 it being noted that the lower wall at the front end of the tube is cut away to form a passageway between the tube and the nozzle. At this point it may be pointed out that an upper portion of the tube wall is cut away in the vicinity of the lower end of the hopper to form a more-or-less elliptical intake opening 41. Consequently, it will be apparent that the powder discharged from the hopper enters into the tube and upon rotation of the auger such powder will be moved along the tube and subsequently discharged through the nozzle 40.

The auger shaft 36 is detachably secured to a double flexible coupling member 43 which, in turn, is secured to the output drive shaft 44 of a gear-reduction unit 45, the latter being driven by a synchronous electric motor 46 by means of the belt 47. As best shown in Figure 1, the electro-magnetic vibrator 29 is supported by a sub-base 48. This sub-base is secured in fixed position on the weighing platform 49 of the scale 12 through vibration-absorbing mountings 50. Thus, the scale responds to the weight of the auger-tube-trough-vibrator assembly including the powder contained within the trough 25 and the tube 22 but not including the hopper which is separately supported by the brackets 11 on the base 10. Such apparatus weight is balanced by suitably positioning the balance weight 51 along the conventional, pivotally-mounted scale beam 52.

Attached to the scale beam 52 is a small mercury switch 53 so disposed that the switch contacts are open when the scale is in the balanced or over-balanced condition. These switch contacts are connected in series between the hopper vibrator 23 and a source of electrical power.

The operation of the apparatus will now be described assuming that the housing 25 and the tube 22 are empty. The weight 51 is moved along the scale beam 52 until such beam is in the horizontal position thereby balancing those components of the apparatus which are supported on the scale platform. In accordance with conventional practice the scale beam is calibrated in suitable units of weight as, for example, ounces. In order to assure proper operation of the feeder apparatus it is essential that the tube 22 be filled with powder at all times and it will be assumed, in this illustrative example, that a few ounces of powder disposed within the tube 22 and overflooding into the housing 25 meets this requirement. Hence, the operator moves the weight 51 toward the free end of the beam 52 a distance corresponding to one ounce beyond the stated balance position. Therefore, the weighing scale is set to what may be termed one ounce underbalanced and, consequently, the beam will be below the horizontal balance position and the free end of the beam will rest against the lower stop 54. In such downwardly-inclined position of the scale beam the mercury within the mercury tube 53 will bridge the switch contacts thereby closing the electrical circuit to the hopper vibrator 23. The hopper is now filled with powder and the vibrations imparted to the hopper by the vibrator 23 will cause a positive flow of the powder from the hopper into the tube 22 and the trough 25. If it be assumed that the motor 46 and the vibrator 29 are not yet energized, the vibratory flow of powder from the hopper will continue until the added weight of such powder results in a counter-clockwise rotation of the scale beam 52 toward the upper stop 55. As the beam moved toward such position the mercury in the switch 53 moves away from the contacts thereby opening the circuit and de-energizing the hopper vibrator 23. Mercury switches are available which open and close contacts upon a tilting of the switch a few degrees from the normal horizontal position. It is apparent, therefore, that in the illustrated arrangement the weighing scale serves to prevent an overflooding of the powder into the housing 25. The drive motor 46 and the electro-magnetic vibrator 29 are controlled by a manually-operated line switch. Closure of such line switch results in the mechanical vibration of the housing 25, tube 22 and auger 35 and the rotation of the auger. It is this combined rotation and vibration of the auger which makes it possible for my apparatus to discharge powder from the nozzle 40 at a positive, predetermined volumetric rate with precise accuracy. The actual volumetric rate at which powder is discharged from the nozzle depends upon the size and design of the auger flutes and the speed of auger rotation both factors being readily controlled. The character of the mechanical or electromagnetic vibrations imparted to the auger and the associated tube 22 are not critical but must be constant, although the vibration amplitude will be higher for very sticky powders than for relatively free-flowing powders.

Vibrating of the auger in a controlled manner enables both sticky and free-flowing materials alike to be metered out by the revolving auger with a maintained accuracy better than 1 percent. Without such auger vibration sticky materials would adhere to and rotate with the auger and thus not feed-out, whereas free-flowing materials would feed-out with less accuracy.

The separately vibrated hopper maintains the level of the powder in the housing, or trough, 25 at substantially a constant level at the bottom discharge opening of the hopper. I here wish to point out that such powder level can be raised or lowered by merely altering the position of the hopper on the supporting brackets 11. In the case of most powders, the maintenance of a predetermined level of powder in the trough 25, to within 1/32 of an inch, is automatic without the need of the weighing scale control hereinabove described. Even though the hopper be continuously vibrated the flow of powder from the hopper decreases or stops completely as the powder level within the trough reaches the plane of the hopper opening. In the case of very free-flowing material, however, the weighing scale control feature is desirable to prevent any possibility of the material excessively to flood the trough. In any case, with the simultaneous vibration of the trough 25 and the auger, and the maintenance of a predetermined level of powder within the trough, the material will be discharged from the apparatus at a rate proportional to the speed of rotation of the auger. In particular, the maintenance of a constant depth of powder over the auger, together with constant vibration, results in a flow of constant density material into and through the auger. This accounts for the high accuracy and reliability of operation of my apparatus over prior powder-feeders in general and over present auger type feeders in particular. A constant speed of auger rotation is assured by using a synchronous drive motor 46.

Reference is now made to Figure 6 which is a fragmentary side view, with parts in section, showing the assembled relationship of the hopper 15, trough 25, tube 22a and auger 35'. As already described, the tube is secured to the trough by means of the screws 26 and the flange 27. Inasmuch as the volumetric rate of powder fed out of the apparatus is related to the size and design of the auger flutes it is desirable to provide a simple arrangement whereby different size augers can be attached to the apparatus for specific ranges of feed rate. Toward this end I provide a plurality of auger-tube assemblies interchangeable with each other in the vibratory trough 25. In the Figure 6 showing the auger-tube assembly is of maximum diameter whereas the assembly shown in Figure 7 is of an intermediate size and that shown in Figure 8 of minimum size. It will be noted that in each assembly the flange 27 is identical as is the length of the tube measured between the flange and the right hand tube end. The auger shafts 36 are likewise identical. It is to be noted that the bearing 37, for the auger shafts 36, is affixed to the trough whereas the other bearing is self-contained on the particular auger-tube assembly. It will be apparent, then, that to remove the auger-tube assembly in the Figure 6 illustration it is necessary only to loosen the shaft set screws 60 and to remove the flange-securing screws 26 whereupon the auger-tube assembly can be withdrawn from the trough. Any of the other size auger-tube assemblies can be secured in operating position in the trough by reversing this procedure.

Attention is again directed to Figure 3 from which it is apparent that the housing, or trough, 25 is considerably larger than the tube 22 and that the powder P discharged from the hopper fills the trough to a depth above the upper wall of the tube. If, now, it be assumed that the tube 22, shown in Figure 3, represents the maximum diameter of the auger-tube assemblies adapted for interchangeable use in the apparatus, the replacement of the tube 22 with one of smaller diameter will merely result in a spacing between the bottom surface of the tube and the bottom wall of the trough. This obviously does not in any way alter the operation of the apparatus as described. However, for precise accuracy of operation it may be desirable to adjust the vertical position of the hopper when such smaller auger-tube assembly is used in order to reduce the level of the powder in the trough and thereby reduce the density of the powder in the tube.

Up to this point I have described my basic apparatus wherein powder is vibratorily discharged from a storage hopper into a transfer trough and onto a rotating auger and such powder is metered out at a precise volumetric rate under the combined action of auger rotation and vibration. Automatic control of the depth of the powder over the effective auger intake area is accomplished generally when the depth of the powder in the transfer trough reaches the discharge opening of the hopper whereby the density of the powder in the auger is maintained constant. Means have been described whereby the elevation of the hopper discharge opening, relative to the auger, can be adjusted to alter the depth of the powder in the transfer trough and a weighing scale arrangement has been disclosed primarily as protection against flooding of the powder, in the case of dry-granular materials, and secondarily as an alternate means of maintaining the depth of the powder discharged from the hopper at a constant, predetermined level. I have also described the interchangeable construction and character of the auger-tube assemblies to adapt the machine for operation over a wide range of discharge characteristics. In the illustrated arrangements, described to this point, the axis of the rotating auger is horizontally disposed and the intake opening in the auger tube, through which the powder enters between the auger flutes, has been disposed directly below the discharge opening of the hopper.

In the case of the very free-flowing materials, and to assure a precise accuracy of operation, it may be desirable to incline the auger so that the powder is moved upwardly toward the discharge nozzle of the apparatus. Such an arrangement is illustrated in the fragmentary view of Figure 9, wherein the reference characters correspond to those used in Figure 1 and which, therefore, is believed to be self-apparent. I only wish to point out that in such tilted disposition of the auger there is no possibility of even the most free-flowing, granular material overrunning the auger and even the very sticky powders will be metered out at a constant rate due to simultaneous vibration and rotation of the auger. The specific angular tilt given to the auger is not of critical importance but a tilt of approximately 20 degrees from horizontal has been found to be generally preferred.

In applications wherein it is desired to meter out powder under conditions of maximum accuracy the arrangement shown in Figure 10 offers certain advantages. Here, it will be noted, that the discharge opening of the hopper is disposed to one side of the intake opening in the tube 22. In such arrangement the powder P builds up around the tube 22 to a depth determined by the bottom of the hopper, and the mechanical vibrations imparted to the tube 22, auger 35 and the trough 25 results in a positive, continuous flow of the powder into the tube. Thus, the weight of the powder in the hopper has no effect upon the density of the powder in the tube 22 and, therefore, the volumetric rate of powder discharged from the apparatus is not effected by changes in the quantity of powder in the hopper.

Having now described several embodiments of my invention, those familiar with present powder feeders and their limitations respecting accuracy and reliability of operation and their use restriction to specific materials will recognize the numerous advantages in a machine made in accordance with this invention. My machine is of simple, rugged construction promoting long, trouble-free operating life. The controlled vibration of the rotating auger and associated assembly assures a metered flow of powdered or granular material into, through and out of, the auger. The control of the level of the powder over the auger is automatic in that the discharge opening of the continuously vibrated storage hopper is spaced from the auger intake opening. An anti-flooding safeguard is provided by placing the auger-tube assembly on a platform weighing scale provided with a mercury switch to shut off the vibratory flow of powder from the hopper when the weight of the powder in the auger-tube assembly exceeds a preselected value.

From the hereinabove given description of several forms of my invention those skilled in this art will find no difficulty in making changes and modifications in the illustrated constructions to meet specific conditions. Such changes and modifications may be made without departing from the spirit and scope of the invention as recited in the following claims.

I claim:

1. Apparatus for dispensing powder at a predetermined rate comprising a storage hopper for the powder and having a discharge opening, a first means for imparting vibration to the hopper, a trough disposed to receive powder discharged from the hopper, a tube disposed within the trough and extending externally thereof said tube having an intake opening within the trough and a dispensing opening external of the trough, an auger disposed within the tube, means rotating the auger at a constant speed, and a second means for vibrating the trough, tube and auger during rotation of the latter.

2. The invention as recited in claim 1 wherein the tube and auger axes are horizontal.

3. The invention as recited in claim 1 wherein the tube and auger axes lie in a plane forming an acute angle with the horizontal plane.

4. The invention as recited in claim 1 wherein the trough includes side walls extending upwardly above the level of the discharge opening of the hopper and the said discharge opening of the hopper is spaced a predetermined distance above the level of the said intake opening of the tube.

5. The invention as recited in claim 4 wherein the discharge opening of the hopper is offset relative to the said intake opening of the tube.

6. Apparatus for dispensing powder at a predetermined rate comprising a storage hopper for the powder and having a discharge opening; means supporting the hopper on a base; a first vibrator imparting vibrations to the hopper; a trough disposed to receive powder discharged from the hopper; a tube extending into the trough, said tube having an intake opening within the trough and a dispensing opening external of the trough; an auger disposed within the tube; drive means rotating the auger at a constant speed; and a second vibrator imparting vibrations to the trough, tube and auger.

7. The invention as recited in claim 6 wherein the second vibrator supports the trough and the second vibrator and drive means are disposed on the platform of a scale, and including a mercury switch secured to the deflectable beam of the scale and adapted to open and close in response to beam deflections, said switch controlling the actuation of the said first vibrator.

8. Apparatus for dispensing powder at a predetermined rate comprising a storage hopper for the powder and having a discharge opening; means supporting the hopper in spaced position over a fixed base; a first vibrator associated with the hopper and adapted, when energized, to vibrate the hopper; a second vibrator secured to the said base; a trough vibratorily supported by the second vibrator and disposed under the discharge opening of the hopper; a bearing secured to one end wall of the trough; a tube extending into the trough through an opening in the opposite end wall of the trough, said tube having an intake opening within the trough and a dispensing opening external of the trough; an auger disposed within said tube, one end of the auger being journaled for rotation in a bearing secured to the external end of the tube and the other end of the auger being journaled in the said bearing secured to the trough; driving means including a drive shaft rotatable at a constant speed; and means removable and flexibly coupling the auger to said drive shaft.

9. The invention as recited in claim 8 wherein the means removably coupling the auger to the drive shaft comprises an auger shaft extending through the bearing secured to the trough, and a double flexible coupling member connecting the said auger shaft to the drive shaft.

10. The invention as recited in claim 8 wherein the auger axis is inclined relative to horizontal.

11. The invention as recited in claim 8 including a radially-extending flange secured to the tube; and fastening means securing the flange to the said opposite end wall of the trough.

12. The invention as recited in claim 8 including adjustable means to space the discharge opening of the hopper a predetermined distance from the intake opening of the tube.

13. The invention as recited in claim 8 including a platform-type weighing scale carried by the said base and wherein the said second vibrator together with the trough, auger and driving means are carried by the scale platform; a pivotally deflectable beam responsive to the weight supported by the platform; and a mercury switch secured to the beam, said switch adapted to open and close in response to predetermined deflections of the beam and said switch controlling the actuation of the said first vibrator.

14. Apparatus for dispensing granular material or the like at a predetermined rate, comprising a member having a material-receiving portion and a material-discharge portion, an auger disposed in said member, means for rotating the auger about its axis to advance the material from the said receiving portion to said discharge portion, and separate power means for deliberately and controllably vibrating the auger during its rotation.

15. Apparatus for dispensing granular material at a predetermined rate, comprising in combination, a hopper with a discharge opening from which the material can flow, means supporting said hopper, means having receiving and discharge portions and disposed beneath said hopper so that material from the hopper flows thereunto, an auger disposed in said receiving means, means for rotating said auger about its axis to advance said material toward its discharge portion, and separate power means for deliberately and controllably vibrating said auger during its rotation.

16. Apparatus for dispensing granular material at a predetermined rate comprising in combination, a hopper with a discharge opening from which the material can flow, means supporting said hopper, means having receiving and discharge portions and disposed beneath said hopper so that material from the hopper flows thereinto, an auger disposed in said receiving means, the axis of said auger being disposed at an angle relative to the horizontal, means for rotating said aguer about its axis to advance said material towards its discharge portion and separate power means for deliberately and controllably vibrating said auger during its rotation.

17. Apparatus for dispensing granular material at a predetermined rate comprising in combination, a hopper with a discharge opening from which the material can flow, means supporting said hopper, a tube having a dispensing opening at one end and an intake opening with which the discharge opening of said hopper communicates, an auger disposed in said tube, means for rotating said auger about its axis at a constant speed, and separate power means for deliberately and controllably vibrating said auger during its rotation.

18. The invention as recited in claim 17 wherein the axes of the tube and auger are disposed at an angle with horizontal plane.

19. The invention as recited in claim 17 wherein the axes of the tube and auger are disposed at an angle with respect to the horizontal plane.

20. The invention as recited in claim 17 including separate means for vibrating the hopper.

21. The invention as recited in claim 17 wherein the discharge opening of the hopper is spaced from and offset relative to the intake opening of the tube.

References Cited in the file of this patent

UNITED STATES PATENTS

| Number | Name | Date |
|---|---|---|
| 1,757,401 | Thomas | May 6, 1930 |
| 1,785,287 | Ryan et al. | Dec. 16, 1930 |
| 1,785,456 | Ousdahl | Dec. 16, 1930 |
| 1,797,871 | Lippert | Mar. 24, 1931 |
| 1,831,561 | Harris | Nov. 10, 1931 |
| 1,975,015 | Murphy | Sept. 25, 1934 |
| 2,107,419 | Ketchpel | Feb. 8, 1938 |
| 2,340,030 | Weyandt | Jan. 25, 1944 |
| 2,386,991 | Thomes | Oct. 16, 1945 |
| 2,541,742 | Booth | Feb. 13, 1951 |
| 2,549,908 | Johansen | Apr. 24, 1951 |
| 2,622,766 | Simon | Dec. 23, 1952 |
| 2,711,814 | McCarthy | June 28, 1955 |

UNITED STATES PATENT OFFICE

CERTIFICATE OF CORRECTION

Patent No. 2,800,252                                              July 23, 1957

Eugene A. Wahl

It is hereby certified that error appears in the printed specification of the above numbered patent requiring correction and that the said Letters Patent should read as corrected below.

Column 8, line 35, for "at an angle with" read -- substantially in a --.

Signed and sealed this 15th day of October 1957.

(SEAL)

Attest:

KARL H. AXLINE
Attesting Officer

ROBERT C. WATSON
Commissioner of Patents